United States Patent Office 2,899,441
Patented Aug. 11, 1959

2,899,441

1-(AMINO AND HYDROXY)ALKYL-2-DIARYL-ALKYL-2-IMIDAZOLINES AND PROCESS

Clinton A. Dornfeld, Glenview, Ill., assignor to G. D. Searle & Co., Chicago, Ill., a corporation of Delaware No Drawing. Application June 18, 1958
Serial No. 742,714

12 Claims. (Cl. 260—309.6)

This invention relates to optionally alkylated 1-(amino and hydroxy)alkyl-2-diarylalkyl-2-imidazolines and a process for the manufacture thereof. More particularly, this invention relates to compounds of the formula

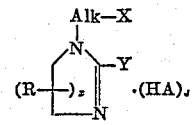

wherein Y is an alkyl radical in which each of two hydrogens is replaced by an aryl radical—for example, a phenyl or naphthyl grouping substituted ad libitum by one or more alkyl radicals, halogen atoms, and/or alkoxy radicals; X is an amino or hydroxy radical; Alk is an alkylene radical; and the expression $(R-)_x$ signifies a maximum of 4 alkyl radicals bonded directly to the imidazoline ring.

Among the alkyl radicals comprehended by the terms of the foregoing formula, particularly lower alkyl groupings are preferred, viz., methyl, ethyl, propyl, isopropyl, butyl, isobutyl, sec-butyl, tert-butyl, pentyl, isopentyl, tert-pentyl, neopentyl, hexyl, isohexyl, heptyl, and like hydrocarbon groupings comprising fewer than 9 carbon atoms.

The aryl substituents called for by Y in the above formula attach to either the same or different carbon atoms of the alkyl radical involved, subject of course to the steric limitations inherent in disposing molecular aggregates of the size of those represented by—typically—the naphthyl grouping. It follows that whereas the benzhydryl radical is perhaps the simplest embodiment of Y, such diaryl(lower alkyl) groupings as benzhydrylmethyl, 2,2-diphenylethyl, dibenzylmethyl, 1,3-diphenylpropyl, 2-naphthyl-3-phenylpropyl, 3-methyl-4,4-diphenylpropyl, 1,4-diphenylbutyl, and 1,4-dinaphthylbenzyl are all especially adapted to the purposes of the instant invention. Similarly qualified are diarylalkyl moieties of the type illustrated wherein one or both aryl constituents are alkylated, halogenated, and/or alkoxylated. The contemplated alkoxy substituents, like the alkyl radicals hereof, are desirably of lower order, which is to say embrasive of fewer than 9 carbon atoms.

The alkylene radicals referred to in the generic formula for compounds of this invention are bivalent saturated acyclic straight- or branched-chain hydrocarbon groupings in which at least two carbon atoms are present, and in general but not unexceptionably total fewer than 5 carbon atoms. Examples of such radicals are:

1,2-ethylene (—CH$_2$CH$_2$—)

Trimethylene (—CH$_2$CH$_2$CH$_2$—)

1,2-propylene (—CH$_2$CHCH$_3$)

Tetramethylene (—CH$_2$CH$_2$CH$_2$CH$_2$—)

2-methyl-1,2-propylene (—CH$_2$C(CH$_3$)$_2$)

and the like.

The application for Letters Patent securing the invention herein described and claimed is a continuation in part of applicant's prior copending application, Serial No. 631,393, filed December 31, 1956, and now forfeited.

Equivalent to the foregoing basic amines for purposes of the present invention are non-toxic acid addition salts thereof having the formula

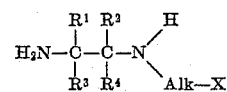

wherein Y, X, Alk, R, and x have the meanings hereinbefore assigned; A is one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, tartrate, citrate, gluconate, ascorbate, benzoate, cinnamate, or the like—which, in combination with the cationic portion of a salt aforesaid, is neither pharmacologically nor otherwise undesirable in pharmaceutical dosage; and s is a positive integer amounting to less than 3.

The compounds to which this invention relates are useful because of their valuable pharmacological properties. Thus, for example, they manifest diuretic, eurythmic, anti-inflammatory, and anti-cholinergic activity, and are, additionally, antibiotic agents.

Manufacture of the subject compounds proceeds by heating an acid of the formula Z—COOH in an inert nonpolar hydrocarbon solvent such as benzene, toluene, xylene, and the like, with an amine of the formula

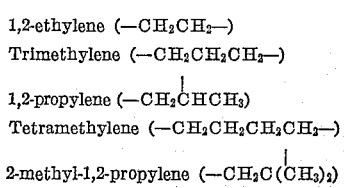

X in the formula for the acid and X, Alk, R$^1$, R$^2$, R$^3$, and R$^4$ in the formula for the amine being defined as before. Means are provided to remove the water formed in process.

Conversion of the amine bases of this invention to corresponding acid addition salts is accomplished by simple admixture of these compounds with 1 or 2 equivalents of any of various inorganic and strong organic acids, the anionic portion of which conforms to A as hereinabove defined.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade, pressures in millimeters of mercury, and relative amounts of materials in parts by weight, except as otherwise noted.

Example 1

A. *1-(2-aminoethyl)-2-benzhydryl-2-imidazoline.*—A mixture of 42 parts of diphenylacetic acid, 31 parts of diethylenetriamine, and 540 parts of xylene is heated at the boiling point of the solvent present for approximately 22 hours. Water formed in process is removed throughout the heating period. The reaction mixture is distilled, and the fraction boiling at 160–175° under 0.1 mm. pressure is found to be 1-(2-aminoethyl)-2-benzhydryl-2-imidazoline, of the formula

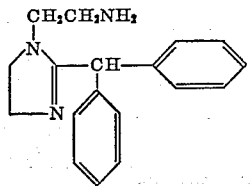

B. *1-(2-aminoethyl)-2-benzhydryl-2-imidazoline dihydrochloride.*—A solution of 21 parts of 1-aminoethyl-2-benzhydryl-2-imidazoline in 80 parts of absolute ethanol is diluted with 2-propanol containing 2 equivalents of hydrogen chloride. The precipitate which forms is collected after 1 hour at room temperatures. Recrystallization from approximately 80 parts of methanol affords pure 1-(2-aminoethyl)-2-benzhydryl-2-imidazoline dihydrochloride, the melting point of which is approximately 302–303°.

Example 2

A. *3-azahexane-1,6-diamine.*—A mixture of 166 parts of 3-(2-aminoethylamino)propionitrile, 21 parts of potassium carbonate, 30 parts of Raney nickel catalyst, and 800 parts of methanol is charged into a bomb under 720 lbs. of hydrogen at 35°. The mixture is agitated until the drop in hydrogen pressure indicates that reduction is complete, the temperature rising to around 55° in process. The mixture is then filtered and the filtrate distilled. The fraction coming over in the range 87.5–96° at 1–2 mm. is the desired 3-azahexane-1,6-diamine.

B. *1-(3-aminopropyl)-2-benzhydryl-2-imidazoline.*—A mixture of 21 parts of diphenylacetic acid, 23 parts of 3-azahexane-1,6-diamine, and 540 parts of xylene is heated at the boiling point under reflux for 43 hours, during which time water formed in process is removed azeotropically. The reaction mixture is allowed to stand at room temperatures overnight, following which a small amount of insoluble matter is filtered off and discarded. Solvent and excess 3-azahexane-1,6-diamine are removed by distillation, starting at water pump pressures and finishing in high vacuum. The product remaining is 1-(3-aminopropyl)-2-benzhydryl-2-imidazoline, of the formula

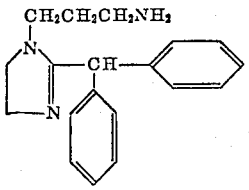

Example 3

A. *1-(2-aminoethyl)-2-dibenzylmethyl-2-imidazoline.*—A mixture of 24 parts of dibenzylacetic acid, 31 parts of diethylenetriamine, and 540 parts of xylene is heated at the boiling point under reflux for 24 hours, during which time water formed in process is azeotropically removed, together with a small amount of excess diethylenetriamine. The reaction mixture is then distilled in vacuo to remove solvent and residual excess amine. The oily product which remains is 1-(2-aminoethyl)-2-dibenzylmethyl-2-imidazoline. It has the formula

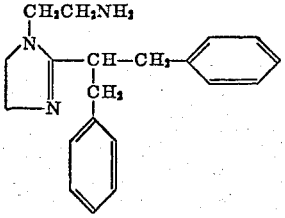

B. *1-(2-aminoethyl)-2-dibenzylmethyl-2-imidazoline dihydrochloride.*—To a solution of 10 parts of 1-(2-aminoethyl)-2-dibenzylmethyl-2-imidazoline in 160 parts of hot absolute ethanol is added a theoretically excess amount of anhydrous hydrogen chloride. Upon partial evaporation of the solvent and chilling, crystals of 1-(2-aminoethyl)-2-dibenzylmethyl-2-imidazoline dihydrochloride are deposited. Dried at 60° for several hours, they melt at 267–270°.

Example 4

A. *1-(2-aminoethyl)-2-[α-(3-phenylpropyl)benzyl]-2-imidazoline.*—A mixture of approximately 25 parts of 2,5-diphenylpentanoic acid, 21 parts of diethylenetriamine, and 450 parts of p-cymene is heated at the boiling point under reflux for 3 hours. Water formed by the reaction and a small amount of diethylenetriamine are concurrently removed azeotropically. At the end of the prescribed heating period, the solution is cooled to room temperatures and extracted with dilute aqueous muriatic acid. The acid extract is treated with decolorizing charcoal, filtered, and made alkaline with aqueous caustic soda. The alkaline mixture, in turn, is extracted with ether. The ether solution is dried over anhydrous potassium carbonate and stripped of solvent by evaporation. The oil which remains is 1-(2-aminoethyl)-2-[α-(phenylpropyl)benzyl]-2-imidazoline, of the formula

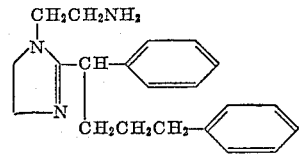

B. *1-(2-aminoethyl)-2-[α-(3-phenylpropyl)benzyl]-2-imidazoline dihydrochloride.*—To a solution of 25 parts of the base of the preceding part A of this example in 60 parts of butanone is added 6 parts of anhydrous hydrogen chloride dissolved in 18 parts of 2-propanol. The resulting solution is mixed into 500 parts of anhydrous ether. Solvent is then decanted from the oily precipitate, which is taken up in 50 parts of hot methanol. After several hours, the crystals which form are filtered off and dried in vacuo at 60°. The product thus obtained is 1-(2-aminoethyl)-2-[α-(3-phenylpropyl)benzyl]-2-imidazoline dihydrochloride, which melts at approximately 235–236°.

Example 5

A. *2-benzhydryl-1-(2-hydroxyethyl)-2-imidazoline.*—A mixture of 106 parts of diphenylacetic acid, 78 parts of N-(2-hydroxyethyl)ethylenediamine, and 225 parts of xylene is heated at the boiling point of the solvent under reflux for 13 hours, water being separated as formed in process. The resultant mixture is distilled in vacuo. The fraction boiling at 215–225° under 1.5 mm. pressure is allowed to stand at room temperatures overnight. Two layers separate. The lower layer is crystallized from butanone to give pure white 2-benzhydryl-1-(2-hydroxyethyl)-2-imidazoline, of the formula

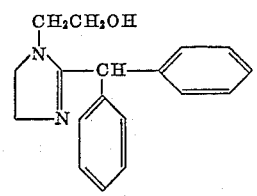

B. *2-benzyhydryl-1-(2-hydroxyethyl)-2-imidazoline hydrochloride.*—Approximately 15 parts of 2-benzhydryl-1-(2-hydroxyethyl)-2-imidazoline is dissolved in 40 parts of butanone. To this solution is added 2 parts of hydrogen chloride dissolved in 6 parts of 2-propanol. The resultant solution precipitates on standing at room temperatures. The precipitate is filtered off and recrystallized from 68 parts of 2-propanol. The product, 2-benzhydryl- 1-(2-hydroxyethyl)-2-imidazoline hydrochloride, melts at approximately 194–195°.

Example 6

A. *2-benzhydryl-1-(2-hydroxypropyl)-2-imidazoline.*— A mixture of 106 parts of diphenylacetic acid and 59 parts of N-(2-hydroxypropyl)ethylenediamine in 1080 parts of xylene is heated at the boiling point under reflux for 22 hours, during which time water formed by the reaction is continuously removed. The reaction mixture is extracted with dilute aqueous muriatic acid, and the acid extract is washed with ether and then made alkaline with aqueous caustic soda. The white precipitate which forms is filtered off and washed on the filter with water. This material is 2-benzhydryl-1-(2-hydroxypropyl)-2-imidazoline. It has the formula.

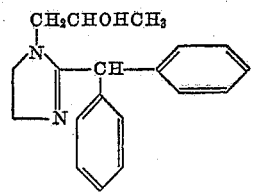

B. *2-benzhydryl-1-(2-hydroxyethyl)-2-imidazoline hydrochloride.*—To a solution of 20 parts of the base of the preceding part A of this example in 80 parts of butanone and 10 parts of methanol is added, with agitation, 3 parts of anhydrous hydrogen chloride dissolved in 9 parts of 2-propanol. Anhydrous ether is then added to induce crystallization. The crystals are isolated by filtration and dried in vacuo at 100° for several hours. The product thus obtained is 2-benzhydryl-1-(2-hydroxypropyl)-2-imidazoline hydrochloride. It melts at approximately 186–187°.

Example 7

A. *2 - benzhydryl - 1 - (2 - hydroxyethyl) - 5 - methyl-2-imidazoline.*—A mixture of 53 parts of diphenylacetic acid, 30 parts of N²-(2-hydroxyethyl)-1,2-propanediamine, and 540 parts of xylene is heated at the boiling point of the solvent under reflux for 24 hours. Water is separated and removed as formed. The reaction mixture is extracted with dilute aqueous muriatic acid. The acid extract is washed twice with ether, and then made alkaline. The alkaline mixture which results is extracted with ether. The ether extract begins to precipitate on standing. Solvent is allowed to evaporate, whereupon the residue is crystallized from 40 parts of butanone. The product thus obtained is 2-benzhydryl-1-(2-hydroxyethyl)-5-methyl-2-imidazoline, which melts at approximately 120° and has the formula

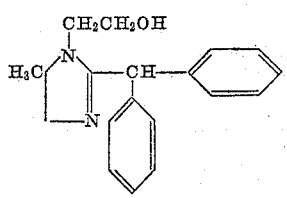

B. *2-benzhydryl-1-(2-hydroxyethyl) - 5 - methyl - 2-imidazoline hydrochloride.*—To a solution of 47 parts of 2-benzhydryl-1-(2-hydroxyethyl)-5-methyl - 2 - imidazoline in 120 parts of butanone is added 6 parts of hydrogen chloride dissolved in approximately 25 parts of 2-propanol. Heat is evolved. The mixture is chilled, and the precipitate formed is subsequently filtered out and dried in vacuo overnight at 80°. The product thus obtained is 2-benzhydryl-1-(2-hydroxyethyl) - 5 - methyl-2-imidazoline hydrochloride.

Example 8

A. *2 - benzhydryl - 4,4 - dimethyl - 1 - (1,1-dimethyl-2-hydroxyethyl)2-imidazoline.*—A mixture of 21 parts of diphenylacetic acid, 16 parts of 2-methyl-N¹-(1,1-dimethyl-2-hydroxyethyl)-1,2 - propanediamine, and 540 parts of xylene is heated at the boiling point under reflux for approximately 90 hours. Water is separated and removed as formed in process. Following the heating period, the reaction mixture is extracted with dilute aqueous muriatic acid; and the resultant acid extract is twice washed with ether and then made alkaline. The alkaline mixture is extracted with a combination of ether and chloroform. The ether-chloroform extract is dried over anhydrous sodium sulfate, whereupon solvent is stripped by evaporation. The semi-crystalline residue is crystallized from approximately 160 parts of butanone. The pure white 2-benzhydryl-4,4-dimethyl-1-(1,1-dimethyl-2-hydroxyethyl)-2 - imidazoline thus obtained has the formula

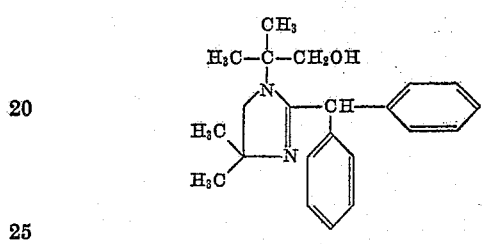

B. *2-benzhydryl-4,4-dimethyl-1 - (1,1 - dimethyl - 2-hydroxyethyl)-2-imidazoline hydrochloride.*—To a solution of 6 parts of 2-benzhydryl-4,4-dimethyl-1-(1,1-dimethyl-2-hydroxyethyl)-2-imidazoline in a mixture of 40 parts of methanol is added 1 equivalent of hydrogen chloride dissolved in 2-propanol. Anhydrous ether is then added until a precipitate forms. The precipitate, separated and recrystallized from approximately 20 parts of butanone, melts at about 167°. The material thus obtained is 2-benzhydryl-4,4-dimethyl-1-(1,1 - dimethyl-2-hydroxyethyl)-2-imidazoline hydrochloride.

Example 9

A. *α-Benzyl-1-naphthaleneacetic acid.*—To a stirred suspension of 29 parts of sodium amide in 4000 parts of liquid ammonia is added 62 parts of 1-naphthaleneacetic acid over a 30-minute period. Then, with continued agitation, a solution of 44 parts of benzyl chloride in 80 parts of anhydrous ether is incorporated during 30 minutes. After a further 30 minutes, the mixture is warmed to evaporate the ammonia, while 1600 parts of anhydrous ether is introduced. When the ammonia has boiled off, 1000 parts of water is added. The ether is then removed by distillation; and the aqueous material which remains is charcoaled, filtered, cooled, and acidified with dilute aqueous muriatic acid. The desired α-benzyl-1-naphthaleneacetic acid is thrown down as a semi-solid precipitate. It is further purified by dissolving it in ether, washing the ether solution with water, and finally removing the ether by distillation. The product is obtained thus as a thick oil.

B. *2 - (α - benzyl - 1 - naphthylmethyl) - 1 - (2 - hydroxyethyl) - 5 - methyl - 2 - imidazoline hydrochloride.*— A mixture of 30 parts of α-benzyl-1-naphthaleneacetic acid, 14 parts of N²-(2-hydroxyethyl)-1,2-propanediamine, and 420 parts of p-cymene is heated at the boiling point under reflux for 11 hours, during which time water is removed as formed in process. Following the heating period, the reaction mixture is extracted with dilute aqueous muriatic acid; and the acid extract is consecutively charcoaled, filtered, cooled, and made alkaline with aqueous caustic soda. The gummy precipitate which results is separated and dissolved in 40 parts of butanone. To this solution is added 2 parts of anhydrous hydrogen chloride dissolved in 6 parts of 2-propanol. The resultant solution is cooled and then mixed into 800 parts of anhydrous ether. The solvent layer is decanted from the oily precipitate thrown down, and the latter is heated under high vacuum for several hours. The precipitate is converted to an amorphous powder by this means. The product thus obtained is 2-(α-benzyl-1-naphthylmethyl)-1-(2-hydroxyethyl)-5-methyl-2-imidazoline hydrochloride, of the formula

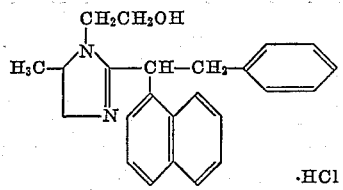

Example 10

A. *α-(p-Fluorophenyl)-α-phenylacetic acid.*—A mixture of 50 parts of mandelic acid and 100 parts of fluorobenzene is heated with agitation to 70°, whereupon, with continued agitation, there is added 130 parts of anhydrous stannic chloride during 30 minutes. The resultant solution is heated with agitation at 85° for 22 hours. The reaction is quenched with 600 parts of a mixture of ice and water, and the resultant mixture is extracted with ether. The ether extract, in turn, is extracted 7 times with 100-part quantities of aqueous 8% sodium carbonate. The first of these carbonate extracts contains mostly tin salts and is rejected. The remaining 6 extracts are combined, treated with decolorizing charcoal, filtered, and finally acidified with dilute aqueous muriatic acid. Upon chilling, crystals of the desired α-(p-fluorophenyl)-α-phenylacetic acid are thrown down. Further purification is achieved by conversion to the diethylamine salt, which is crystallized from a mixture of benzene and hexane. This salt melts at 111–115°. The acid is regenerated by addition of an excess of dilute aqueous muriatic acid. It is extracted into ether, the ether extract is dried over anhydrous sodium sulfate, and—finally—solvent is evaporated to yield α-(p-fluorophenyl)-α-phenylacetic acid as a solid residue melting at 104–106°.

B. *2 - [α - (p - fluorophenyl)benzyl] - 4,4 - dimethyl - 1 - (1,1 - dimethyl - 2 - hydroxyethyl) - 2 - imidazoline.*—A mixture of 23 parts of α-(p-fluorophenyl)-α-phenylacetic acid, 17 parts of 2-methyl-N¹-(1,1-dimethyl-2-hydroxyethyl)-1,2-propanediamine, and 600 parts of p-cymene is heated at the boiling point under reflux for 18 hours, during which time water is separated and removed as formed in process. The reaction mixture is extracted with dilute aqueous muriatic acid. The resultant extract, in turn, is treated with decolorizing charcoal and thereupon made alkaline with aqueous caustic soda. The alkaline mixture is extracted with ether. The ether solution is dried over anhydrous potassium carbonate, then stripped of solvent by evaporation. The oil which results is the desired 2-[α-(p-fluorophenyl)benzyl]-4,4-dimethyl-1-(1,1-dimethyl-2-hydroxyethyl)-2-imidazoline, of the formula

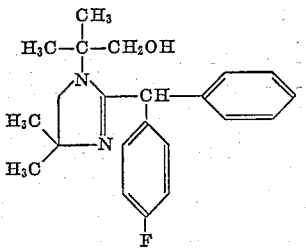

C. *2 - [α - (p - fluorophenyl)benzyl] - 4,4 - dimethyl - 1 - (1,1 - dimethyl - 2 - hydroxyethyl) - 2 - imidazoline hydrochloride.*—A solution of 2 parts of anhydrous hydrogen chloride in 6 parts of 2-propanol is added to a solution of 12 parts of the base of the preceding part B of this example in 20 parts of ethyl acetate, with agitation. The solution thus obtained is mixed into 500 parts of anhydrous ether. Solvent is decanted from the gummy precipitate which forms. The precipitate is taken up in 40 parts of hot butanone. This solution is mixed into 200 parts of ethyl acetate. Solvent is again decanted from the oily precipitate which forms, and the latter is heated in vacuo at 80° for several hours. A fine powder results. This is the desired 2-[α-(p-fluorophenyl)benzyl]-4,4-dimethyl-1-(1,1-dimethyl-2-hydroxyethyl)-2-imidazoline hydrochloride, which melts in the range 105–115°.

Example 11

A. *2 - [α - (p - chlorophenyl)benzyl] - 1 - (2 - hydroxyethyl)-5-methyl-2-imidazoline.*—A mixture of 17 parts of α-(p-chlorophenyl)-α-phenylacetic acid, 9 parts of N²-(2-hydroxyethyl)-1,2-propanediamine, and 540 parts xylene is heated at the boiling point under reflux for 18 hours. Water is removed azeotropically as formed. The reaction mixture is extracted with dilute aqueous muriatic acid; and the acid extract is consecutively charcoaled, filtered, and made alkaline with aqueous caustic soda. The alkaline mixture is extracted with ether. The ether extract, in turn, is dried over anhydrous potassium carbonate and stripped of solvent by evaporation. The stiff oil which remains is 2-[α-(p-chlorophenyl)benzyl] - (2 - hydroxyethyl) - 5 - methyl-2-imidazoline, of the formula

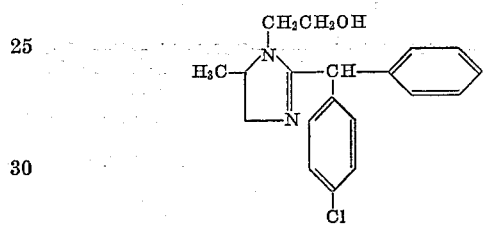

B. *2 - [α - p - chlorophenyl)benzyl] - 1 - (2 - hydroxyethyl)-5-methyl-2-imidazoline hydrochloride.*—To a solution of 14 parts of the base of the preceding part A of this example in 30 parts of hot butanone is added a solution of 2 parts of anhydrous hydrogen chloride in 6 parts of 2-propanol. The resultant solution is mixed into 280 parts of anhydrous ether. The precipitate which forms is separated and taken up in 130 parts of hot butanone. Again, this solution is mixed into 280 parts of anhydrous ether. Solvent is decanted from the white precipitate thrown down. Recrystallized from butanone, it melts at approximately 171°. The material thus obtained is 2-[α-(p-chlorophenyl)benzyl]-1-(2-hydroxyethyl)-5-methyl-2-imidazoline hydrochloride.

Example 12

A. *α - (p - Bromophenyl) - α - phenylacetic acid.*—A mixture of 50 parts of mandelic acid and 200 parts of bromobenzene is heated to 70°, whereat, with agitation, there is cautiously added 130 parts of anhydrous stannic chloride over a period of 1 hour. The resultant solution is heated at 75–80° for 17 hours. It is then dumped into a mixture of ice and water; and the resultant mixture is extracted with ether. The ether extract, in turn, is extracted with 7 100-part portions of aqueous 8% sodium carbonate. The first of these extracts is discarded, the remaining 7 being combined, treated with decolorizing charcoal, filtered, and finally acidified with dilute aqueous muriatic acid. After cooling, the precipitate which forms is filtered off. It is further purified by conversion to the diethylamine salt, which is crystallized from a mixture of benzene and hexane. The salt melts in the range 105–110°. Treatment with excess dilute aqueous muriatic acid regenerates the original product, which is the desired α-(p-bromophenyl)-α-phenylacetic acid. The product is still further purified by recrystallization from aqueous 50% acetic acid.

B. *2 - [α - (p - bromophenyl)benzyl] - 1 - (2 - hydroxyethyl) - 5 - methyl - 2 - imidazoline hydrochloride.*—A mixture of 15 parts of α-(p-bromophenyl)-α-phenylacetic acid, 7 parts of N²-(2-hydroxyethyl)-1,2-propanediamine, and 420 parts of p-cymene is heated at the boiling point for 21 hours, during which time the water formed is continuously removed. The reaction mixture is extracted with dilute aqueous muriatic acid at the close of the heating period; and the acid extract is charcoaled, filtered, cooled, and made alkaline with aqueous caustic soda. The precipitate which forms is separated and taken up in 50 parts of butanone. To this solution is added 2 parts of anhydrous hydrogen chloride dissolved in 6 parts of 2-propanol. The resultant solution is chilled and mixed into 800 parts of anhydrous ether. The oil thrown down is separated by decantation of the supernatant solvent. Heated at 80–90° in vacuo, the oil is converted to an amorphous powder. This powder is the desired 2-[α-(p-bromophenyl)benzyl]-1-(2-hydroxyethyl)-5-methyl-2-imidazoline hydrochloride, which has the formula

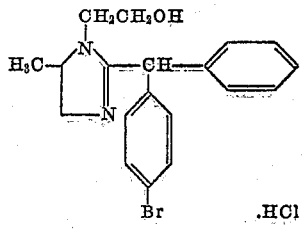

Example 13

A. 2 - [bis(p - chlorophenyl)methyl] - 1 - (2 - hydroxyethyl)-5-methyl-2-imidazoline.—A mixture of 28 parts of bis(p-chlorophenyl)acetic acid, 13 parts of $N^2$-(2-hydroxyethyl)-1,2-propanediamine, and 600 parts of p-cymene is heated at the boiling point under reflux for 18 hours, during which time water formed by the reaction is continuously separated and removed. Following the heating period, the hot reaction mixture is extracted with dilute aqueous muriatic acid. The acid extract is treated with decolorizing charcoal, filtered, chilled, and finally made alkaline with aqueous caustic soda. The white precipitate which forms is filtered off, washed on the filter with water, and dried for several hours at 50°. The 2-[bis(p-chlorophenyl)methyl]-1-(2-hydroxyethyl)-5-methyl-2-imidazoline thus formed melts at approximately 130–131° and has the formula

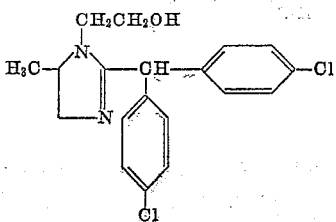

B. 2 - [bis(p - chlorophenyl)methyl] - 1 - (2 - hydroxyethyl) - 5 - methyl - 2 - imidazoline hydrochloride. —A mixture of 12 parts of the base of the preceding part A of this example with 40 parts of hot butanone is treated with 2 parts of anhydrous hydrogen chloride dissolved in 6 parts of 2-propanol. The resultant solution is mixed into 500 parts of anhydrous ether. From the gummy precipitate which forms, solvent is removed by decantation. Recrystallized from butanone, the precipitate melts at 184–186°. The product thus obtained is 2 - [bis(p - chlorophenyl)methyl] - 1 - (2 - hydroxyethyl)-5-methyl-2-imidazoline hydrochloride.

Example 14

A. α-(2,4-dichlorophenyl)-α-phenylacetic acid.—Over a 1-hour period, 133 parts of anhydrous stannic chloride is added, with agitation, to a mixture of 63 parts of mandelic acid and 104 parts of m-dichlorobenzene. The resultant solution is maintained with agitation at 80–85° for 5½ hours. The reaction mixture is worked up by essentially the procedure described in Example 10A hereinabove. The desired α-(2,4-dichlorophenyl)-α-phenylacetic acid is obtained thus as a brown oil.

B. 2-[α-(2,4-dichlorophenyl)benzyl] - 1 - (2-hydroxyethyl)-5-methyl-2-imidazoline.—A mixture of 28 parts of α-(2,4-dichlorophenyl)-α-phenylacetic acid, 13 parts of $N^2$-(2-hydroxyethyl)-1,2-propanediamine, and 540 parts of p-cymene is heated at the boiling point under reflux for 18 hours. The hot reaction mixture is then extracted with dilute aqueous muriatic acid. The acid extract is consecutively charcoaled, filtered, cooled, and basified with aqueous caustic soda. The resultant alkaline mixture is extracted with ether. The ether extract, in turn, is dried over anhydrous potassium carbonate, filtered, and stripped of solvent by distillation. The oil which remains is the desired 2-[α-(2,4-dichlorophenyl)benzyl]-1-(2-hydroxyethyl)-5-methyl-2-imidazoline, of the formula

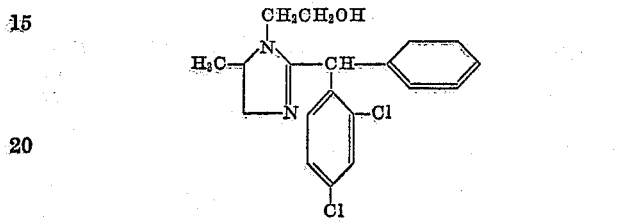

C. 2-[α-(2,4-dichlorophenyl)benzyl] - 1 - (2-hydroxyethyl)-5-methyl-2-imidazoline hydrochloride.—Approximately 8 parts of 2-[α-(2,4-dichlorophenyl)benzyl]-1-(2-hydroxyethyl)-5-methyl-2-imidazoline is dissolved in 40 parts of butanone, and a slight excess of anhydrous hydrogen chloride dissolved in 2-propanol is incorporated therein, with agitation. The resultant mixture is diluted with 200 parts of ethyl acetate. The solvent is decanted from the oily precipitate which forms. The precipitate is heated in vacuo at 80° and thus transformed into an amorphous solid. This material is 2-[α-(2,4-dichlorophenyl)benzyl]-1-(2-hydroxyethyl)-5-methyl - 2 - imidazoline hydrochloride.

Example 15

A. α-benzyl-α-(p-isopropylphenyl)acetic acid.—To a stirred suspension of 49 parts of sodium amide in 4000 parts of liquid ammonia is added over a period of ½ hour 100 parts of p-isopropylphenylacetic acid dissolved in 160 parts of anhydrous ether. The resultant mixture is stirred for 15 minutes, whereupon a solution of 76 parts of benzyl chloride in 80 parts of anhydrous ether is cautiously added over a ½-hour period. Agitation is continued, and the mixture is heated to drive off ammonia. Approximately 1600 parts of anhydrous ether is added while the ammonia is being removed. The ether suspension which results is maintained with agitation at the boiling point while 1000 parts of water is added. Heating is continued, causing the ether to be evaporated. The aqueous mixture which remains is charcoaled, filtered, chilled, and acidified with dilute aqueous muriatic acid. The semi-solid thus formed is filtered off and taken up in ether. The ether solution is washed with water, then stripped of solvent by evaporation. The yellow solid which remains is crystallized from hexane. There is obtained by this means α-benzyl-α-(p-isopropylphenyl)-acetic acid, which melts in the range 105–110°.

B. 1-(2-aminoethyl) - 2 - [1-(p-isopropylphenyl) - 2 - phenylethyl]-2-imidazoline dihydrochlorode.—A mixture of 27 parts of α-benzyl-α-(p-isopropylphenyl)acetic acid, 34 parts of diethylenetriamine, and 450 parts of xylene is heated at the boiling point for 25 hours, water being removed as formed in process. The reactants are stripped of solvent and excess diethylenetriamine by heating at 90–95° (jacket temperatures) under reduced pressures. The residual oil is dissolved in 80 parts of butanone, and to this solution is added 12 parts of anhydrous hydrogen chloride dissolved in 36 parts of 2-propanol. The precipitate which forms is filtered off and discarded. The filtrate is mixed into 800 parts of anhydrous ether. The solvent is decanted from the oily precipitate thrown down, and the latter is heated at 90–95° under high vacuum. It is thus transformed into an amorphous powder, which is the desired 1-(2-aminoethyl)-2-[1-(p-isopropylphenyl)-2-phenylethyl]-2-imidazoline dihydrochloride, of the formula

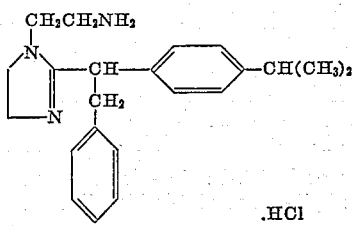

.HCl

*Example 16*

1-(2-hydroxyethyl) - 5 - methyl-2-[α-(2,4,6-trimethylphenyl)benzyl]-2-imidazoline.—A mixture of 10 parts of α-(2,4,6-trimethylphenyl)-α-phenylacetic acid, 5 parts of $N^2$-(2-hydroxyethyl)-1,2-propanediamine, and 520 parts of p-cymene is heated at the boiling point for 19 hours as water formed by the reaction is azeotropically removed. The reaction mixture is then extracted with dilute muriatic acid. The acid extract, in turn, is treated with decolorizing charcoal, filtered, and finally made alkaline with aqueous caustic soda. The resultant mixture is extracted with ether. The ether extract is dried over anhydrous potassium carbonate and stripped of solvent by distillation. The oil which remains becomes semi-crystalline upon standing and is recrystallized from ethyl acetate. The colorless 1-(2-hydroxyethyl)-5-methyl-2-[α-(2,4,6-trimethylphenyl)benzyl] - 2 - imidazoline thus formed melts at approximately 160–161°. The product has the formula

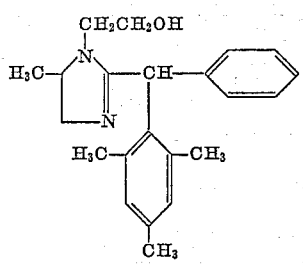

*Example 17*

A. α-(3,4-dimethoxyphenyl)-α-veratrylacetic acid.—To a suspension of 33 parts of sodium amide in 3200 parts of liquid ammonia is added, with agitation, 80 parts of 3,4-dimethoxyphenylacetic acid during 30 minutes. The resulting dark brown solution is agitated for a further 15 minutes, whereupon a solution of 84 parts of veratryl chloride in 130 parts of anhydrous ether is cautiously added during 30 minutes. The brown solution becomes colorless in process. Agitation is maintained throughout, and for 30 minutes after addition of the chloride is complete. Ammonia is then driven off by heating, while 1600 parts of anhydrous ether is incorporated. The resulting suspension is heated at the boiling point for 15 minutes, following which 1000 parts of water is introduced. Heating is continued until the ether is evaporated. The aqueous residue is treated with decolorizing charcoal, filtered, cooled, and acidified with dilute aqueous muriatic acid. The precipitate which forms is filtered off and recrystallized from benzene. The α-(3,4-dimethoxyphenyl)-α-veratrylacetic acid thus obtained melts at approximately 144–145°.

B. 1-(2-aminoethyl)-2-(α-veratrylveratryl) - 2 - imidazoline.—A mixture of 17 parts of the acid of the preceding part A, 10 parts of diethylenetriamine, and 540 parts of xylene is heated at the boiling point under reflux for 30 hours, during which time water is removed as formed. The reaction mixture is then washed 3 times with water to remove excess diethylenetriamine, following which it is extracted with dilute aqueous muriatic acid. The acid extract is made alkaline, and the resulting mixture is extracted with ether. The ether solution is dried over anhydrous potassium carbonate and stripped of solvent by distillation. There remains, as an oil, the desired 1-(2-aminoethyl)-2-(α-veratrylveratryl)-2-imidazoline, which has the formula

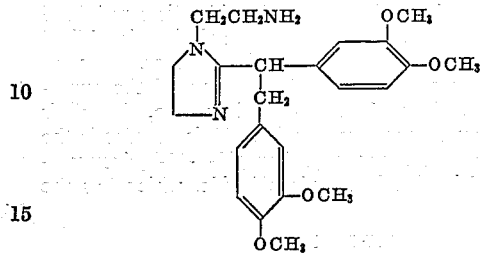

*Example 18*

A. 2 - [α-(p-methoxybenzyl)benzyl]-4,4-dimethyl-1-(1,1-dimethyl-2-hydroxyethyl)-2-imidazoline.—A mixture of 26 parts of 3-(p-methoxyphenyl)-2-phenylpropionic acid and 18 parts of 2-methyl-$N^1$-(1,1-dimethyl-2-hydroxyethyl)-1,2-propanediamine in 520 parts of p-tert-butyltoluene is heated at the boiling point under reflux for 20 hours, water being removed as formed in process. The reaction mixture is then extracted with dilute aqueous muriatic acid; and the acid extract is consecutively charcoaled, filtered, and made alkaline with aqueous caustic soda. The resultant mixture is extracted with ether. The ether extract is dried over anhydrous potassium carbonate and stripped of solvent by distillation. The desired 2-[α-(p-methoxybenzyl)benzyl]-4,4-dimethyl-1-(1,1-dimethyl-2-hydroxyethyl)-2-imidazoline is thus obtained as a heavy syrup. The product has the formula

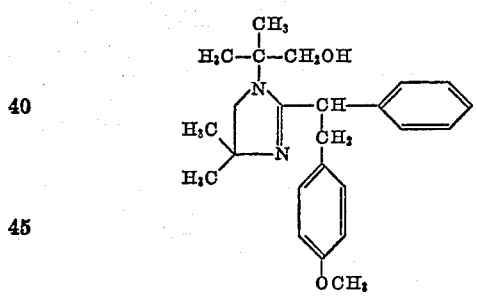

B. 2-[α-(p-methoxybenzyl)benzyl] - 4,4 - dimethyl-1-(1,1-dimethyl-2-hydroxyethyl) - 2 - imidazoline hydrochloride.—To a solution of 48 parts of the base of the preceding part A of this example in 70 parts of butanone is added with agitation, 5 parts of anhydrous hydrogen chloride dissolved in 16 parts of 2-propanol. This solution is cooled and mixed into 1000 parts of anhydrous ether. Solvent is decanted from the precipitate formed, which is then heated in vacuo at 80° to give an amorphous product melting at 88–92°. This material is 2-[α-(p-methoxybenzyl)benzyl] - 4,4 - dimethyl-1-(1,1-dimethyl-2-hydroxyethyl)-2-imidazoline hydrochloride.

*Example 19*

A. 1-(2-hydroxyethyl) - 2 - [α-(p-methoxybenzyl)-p-methoxybenzyl]-5-methyl-2-imidazoline.—A mixture of 14 parts of 2,3-bis(p-methoxyphenyl)propionic acid, 6 parts of $N^2$-(2-hydroxyethyl)-1,2-propanediamine, and 260 parts of p-cymene is heated at the boiling point under reflux for 7 hours, during which time water formed by the reaction is azeotropically removed. The reaction mixture is then extracted with dilute aqueous muriatic acid. The acid extract is charcoaled, filtered, chilled, and made alkaline with aqueous caustic soda. The resultant alkaline mixture is extracted with ether. The ether extract is dried over anhydrous potassium carbonate and stripped of solvent by distillation. The residual oil is the desired 1-(2-hydroxyethyl)-2-[α-(p-methoxybenzyl)-p-methoxybenzyl]-5-methyl-2-imidazoline.

The product has the formula

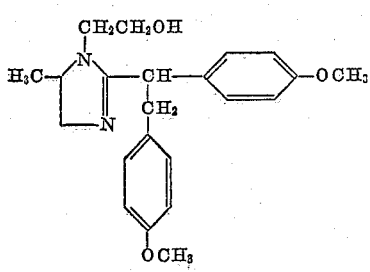

B. *1 - (2 - hydroxyethyl) - 2 - [α - (p-methoxybenzyl)-p-methoxybenzyl]-5-methyl-2-imidazoline maleate.*—To a solution of 13 parts of 1-(2-hydroxyethyl)-2-[α-(p-methoxybenzyl) - p - methoxybenzyl] - 5 - methyl - 2-imidazoline in 80 parts of hot butanone is added a solution of slightly more than 1 equivalent of anhydrous hydrogen chloride in 2-propanol. The resultant solution is cooled and mixed with 500 parts of anhydrous ether. The solvent layer is decanted from the oily precipitate formed. The amine base is regenerated by dissolving the precipitate in hot water, charcoaling, filtering, chilling, and making alkaline with aqueous caustic soda. The resultant mixture is extracted with ether, and the ether solution is dried over anhydrous potassium carbonate. Solvent is stripped by distillation, and the residue is combined with 1 molar equivalent of maleic acid dissolved in hot butanone. The resultant solution is chilled and mixed into 800 parts of anhydrous ether. Supernatant solvent is decanted from the oily precipitate thrown down, and this precipitate is heated in vacuo at 60°. The "hard" syrup thus obtained is the desired 1-(2 - hydroxyethyl) - 2 - [α - (p - methoxybenzyl) - p-methoxybenzyl]-5-methyl-2-imidazoline maleate.

*Example 20*

A. *4,4 - bis(p - methoxyphenyl)pentanoic acid.*—Approximately 50 parts of 4,4-bis(p-hydroxyphenyl)pentanoic acid is dissolved in 200 parts of methanol, and then 66 parts of aqueous 30% caustic soda is added. Approximately 65 parts of dimethyl sulfate is next slowly introduced, with agitation, while the mixture is gently heated at 85–95°. As soon as the mixture becomes acid to test paper, a further quantity of alkali and of dimethyl sulfate is introduced in the manner above described. This process is continued until the mixture remains basic, signifying the end of methylation. A large volume of water is then added, causing the precipitation of an oil. The oil is separated from the accompanying aqueous phase by decantation, and hydrolyzed by heating at the boiling point with an excess of aqueous 10% caustic soda for 1 hour. The resultant solution is filtered, cooled, and acidified with muriatic acid. An oil is again thrown down. The mixture is cooled and the aqueous phase decanted. The product which remains is extracted with ether, and the ether solution is dried over anhydrous sodium sulfate. Stripping of solvent by evaporation leaves as a residue the desired 4,4-bis(p-methoxyphenyl)pentanoic acid in the form of a thick brown oil.

B. *1 - (2 - hydroxyethyl) - 2 - [3,3 - bis(p-methoxyphenyl)butyl]-5-methyl-2-imidazoline.*—A mixture of 15 parts of 4,4-bis(p-methoxyphenyl)pentanoic acid, 6 parts of N²-(2-hydroxyethyl)-1,2-propanediamine, and 300 parts of p-cymene is heated at the boiling point for 24 hours during which water is removed azeotropically as formed. The hot reaction mixture is then extracted with dilute aqueous muriatic acid. The acid extract is charcoaled, filtered, cooled, and made alkaline with aqueous caustic soda. The resultant alkaline mixture is extracted with ether. The ether extract, in turn, is dried over anhydrous potassium carbonate and stripped of solvent by evaporation. The oil which remains is the desired 1-(2 - hydroxyethyl) - 2 - [3,3 - bis(p - methoxyphenyl)-butyl]-5-methyl-2-imidazoline, the formula of which is

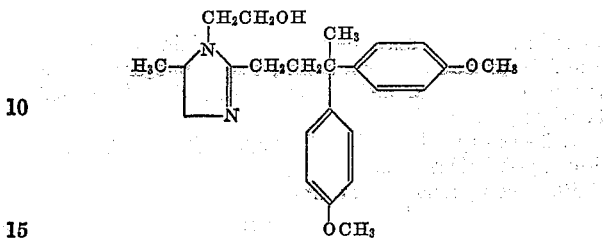

C. *1 - (2 - hydroxyethyl) - 2 - [3,3 - bis(p - methoxyphenyl)butyl]-5-methyl-2-imidazoline hydrochloride.*—A solution of 11 parts of the base of the preceding part B of this example in 40 parts of ethyl acetate is treated with 1 part of anhydrous hydrogen chloride dissolved in 3 parts of 2-propanol. The resultant solution is chilled and dumped, with agitation, into 500 parts of anhydrous ether. The oily precipitate which forms is isolated by decantation of the supernatant solvent. The precipitate, heated in vacuo at 80°, is converted into an amorphous solid. This material is 1-(2-hydroxyethyl)-2-[3,3-bis-(p-methoxyphenyl)butyl]-5-methyl-2-imidazoline hydrochloride.

What is claimed is:

1. A compound of the formula

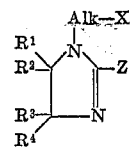

wherein X is selected from the group consisting of amino and hydroxyl radicals; Alk is an alkylene radical containing more than 1 and fewer than 5 carbon atoms; $R^1$, $R^2$, $R^3$, and $R^4$ are selected from the group consisting of hydrogen and methyl radicals, and Z is a lower alkyl radical in which each of 2 hydrogens is replaced by a member of the group consisting of phenyl, (lower alkyl)phenyl, halo phenyl, (lower alkoxy)phenyl, and naphthyl radicals.

2. A compound of the formula

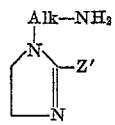

wherein Alk is an alkylene radical containing more than 1 and fewer than 5 carbon atoms, and Z' is a diphenyl (lower alkyl) radical.

3. 1-(2-aminoethyl)-2-benzhydryl-2-imidazoline.

4. A compound of the formula

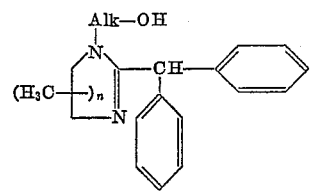

wherein Alk is an alkylene radical containing more than 1 and fewer than 5 carbon atoms and n is an integer amounting to less than 3.

5. 2-benzhydryl-1-(2-hydroxyethyl)-2-imidazoline.

6. 2 - benzhydryl - 1 - (2-hydroxyethyl) - 5 - methyl - 2-imidazoline.

7. 2 - benzhydryl-4,4-dimethyl-1-(1,1-dimethyl - 2 - hydroxyethyl)-2-imidazoline.

8. A compound of the formula

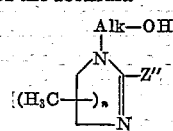

wherein Alk is an alkylene radical containing more than 1 and fewer than 5 carbon atoms, $n$ is an integer amounting to less than 3, and $Z''$ is a nuclearly-halogenated benzhydryl radical.

9. 2 - [α - (p - chlorophenyl)benzyl]-1-(2-hydroxyethyl)-5-methyl-2-imidazoline.

10. A compound of the formula

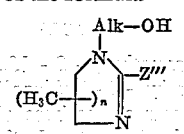

wherein Alk is an alkylene radical containing more than 1 and fewer than 5 carbon atoms, $n$ is an integer amounting to less than 3, and $Z'''$ is a nuclearly-alkoxylated diphenyl(lower alkyl) radical.

11. 1-(2-hydroxyethyl) - 2 - [α-(p - methoxybenzyl) - p methoxybenzyl]-5-methyl-2-imidazoline.

12. In the process for manufacturing compounds of the formula

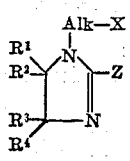

wherein X is selected from the group consisting of amino and hydroxyl radicals; Alk is an alkylene radical containing more than 1 and fewer than 5 carbon atoms; $R^1$, $R^2$, $R^3$, and $R^4$ are selected from the group consisting of hydrogen and methyl radicals; and Z is a lower alkyl radical in which each of 2 hydrogens is replaced by a member of the group consisting of phenyl, (lower alkyl)phenyl, halo phenyl, (lower alkoxy)phenyl, and naphthyl radicals, the step which comprises heating an acid of the formula

Z—COOH in an inert non-polar hydrocarbon solvent with an amine of the formula

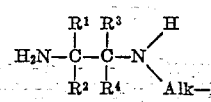

Z in the formula for the acid and X, Alk, $R^1$, $R^2$, $R^3$, $R^4$ in the formula for the amine being defined as before.

No references cited.

UNITED STATES PATENT OFFICE
Certificate of Correction

Patent No. 2,899,441            August 11, 1959

Clinton A. Dornfeld

It is hereby certified that error appears in the printed specification of the above numbered patent requiring correction and that the said Letters Patent should read as corrected below.

Column 8, line 22, for "benzyl]-(2-hydroxyethyl)-" read —benzyl]-1-(2-hydroxyethyl)-—; line 33, for "2-[α-p-chlorophenyl)" read —2-[α-(p-chlorophenyl)—; column 10, lines 15 to 22, the formula should appear as shown below instead of as in the patent—

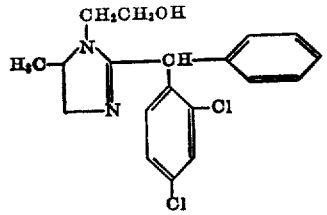

column 10, line 62, for "dihydrochlorode" read —dihydrochloride—.

Signed and sealed this 16th day of February 1960.

[SEAL]

Attest:
KARL H. AXLINE,
*Attesting Officer.*

ROBERT C. WATSON,
*Commissioner of Patents.*